United States Patent
Bauer et al.

(10) Patent No.: US 7,451,481 B2
(45) Date of Patent: Nov. 11, 2008

(54) DATABASE SYSTEM AND METHOD FOR ENCRYPTION AND PROTECTION OF CONFIDENTIAL INFORMATION

(75) Inventors: Stephanie Bauer, Arlington, MD (US); Jonathan N. Freedman, Chevy Chase, MD (US); Miriam Jaffe, Columbia, MD (US); Susan M. Zloth, Castle Rock, CO (US); Daniel J. Lane, North Potomac, MD (US)

(73) Assignee: Merchant Link, LLC, Silver Spring, MD (US)

( * ) Notice: Subject to any disclaimer, the term of this patent is extended or adjusted under 35 U.S.C. 154(b) by 11 days.

(21) Appl. No.: 11/366,189

(22) Filed: Mar. 2, 2006

(65) Prior Publication Data

US 2008/0040776 A1     Feb. 14, 2008

Related U.S. Application Data

(60) Provisional application No. 60/676,681, filed on Apr. 29, 2005.

(51) Int. Cl.
G06F 17/30 (2006.01)
(52) U.S. Cl. ................................. 726/3; 705/64; 705/75
(58) Field of Classification Search ........................ None
See application file for complete search history.

(56) References Cited

U.S. PATENT DOCUMENTS 6,332,193 B1 * 12/2001 Glass et al. .................. 713/170
6,938,019 B1 * 8/2005 Uzo ............................. 705/65
2003/0061171 A1 * 3/2003 Gilbert et al. ................ 705/65
2004/0073688 A1 * 4/2004 Sampson .................... 709/229
2004/0172309 A1 * 9/2004 Selwanes et al. ............... 705/4

OTHER PUBLICATIONS

Shift4 Releases New Technology to Insure the Security of Its Merchants' and Partners' Payment Processing, *Tokenization Moves the Liability for Securing Credit Card Data Away from Merchants' and POS Application Developers*, Las Vegas, Nevada, oct. 5, 2005.

(Continued)

*Primary Examiner*—Emmanuel L Moise
*Assistant Examiner*—David J Pearson
(74) *Attorney, Agent, or Firm*—Jackson Walker L.L.P.; Christopher J. Rourk

(57) ABSTRACT

A database system for encryption and protection of confidential data is provided. The database system includes a data source system receiving confidential data and first associated data. A secure data network interface system is connected to the data source system over an open network, the data network interface system receives the confidential data and the first associated data from the data source system and further comprises a secure data storage system coupled to the data network interface system and isolated from the open network, a data encryption system generating a unique encrypted identifier for the confidential data, and a data association system associating the confidential data with the unique encrypted identifier and storing the confidential data, the first associated data and the unique encrypted identifier in the secure data storage system.

15 Claims, 2 Drawing Sheets

OTHER PUBLICATIONS

"Storing Credit Card Data, A Look at the Business Needs, Regulations and Solutions Surrounding the Issue," Authored by Dr. Heather Mark, Ph.D., CISSP, Jan. 2008.

Letter from Michael J. Andelson of Best Best & Krieger LLP to Christopher Justice, President, Merchant Link, LLC and Michael P. Duffy, Chief Executive Officer of Chase Paymentech Solutions, LLC, dated Dec. 14, 2006.

International Search Report and Written Opinion in PCT/US2006/16745 mailed Jun. 18, 2007 (10 pgs.).

* cited by examiner

DATABASE SYSTEM AND METHOD FOR ENCRYPTION AND PROTECTION OF CONFIDENTIAL INFORMATION

CROSS-REFERENCE TO RELATED APPLICATION

This application claims priority to U.S. provisional application 60/676,681, filed May 10, 2005, which is hereby incorporated by reference for all purposes.

FIELD OF THE INVENTION

The present invention pertains to the field of database systems, and more particularly to a database system and method for encryption and protection of confidential information that uses a unique surrogate identifier for confidential information that is stored on devices that are accessible over an open network.

BACKGROUND OF THE INVENTION

Data communications channels such as computer networks have varying degrees of security. Some computer networks, such as the Internet, are open to a large number of users. Computers that are connected to these networks may be subject to attack from third parties that want access to confidential information that is stored on the computers. This problem can be exacerbated when the confidential information is third party confidential information that is only used for short periods of time and which is then stored for future use, such as personnel data, medical data, business data, financial data, or other data.

Although firewalls and other security devices can be used to provide some protection, active monitoring of network state and data flows is required to provide the highest level of security. However, most businesses cannot afford to provide such high levels of security.

SUMMARY OF THE INVENTION

In accordance with the present invention, a database system for encryption and protection of confidential data is provided that overcomes known problems with encryption and protection of confidential data.

In particular, a database system for encryption and protection of confidential data is provided that does not require confidential data to be stored in a manner where it is accessible over an open network.

In accordance with an exemplary embodiment of the present invention, a database system for encryption and protection of confidential data is provided. The database system includes a data source system receiving confidential data and first associated data. A secure data network interface system is connected to the data source system over an open network, the data network interface system receives the confidential data and the first associated data from the data source system and further comprises a secure data storage system coupled to the data network interface system and isolated from the open network, a data encryption system generating a unique encrypted identifier for the confidential data, and a data association system associating the confidential data with the unique encrypted identifier and storing the confidential data, the first associated data and the unique encrypted identifier in the secure data storage system. A secure data network coupled to the secure data network interface system receives the confidential data and the first associated data, generating second associated data, and provides the second associated data to the secure data network interface system. The data association system of the secure data network interface system receives the second associated data, associates the second associated data with the confidential data, the first associated data and the unique encrypted identifier and stores the confidential data, the first associated data and the unique encrypted identifier in the secure data storage system. The secure data network interface system provides the unique encrypted identifier and the second associated data to the data source system over the open network. The data source system stores the first associated data, the unique identifier and the second associated data without the confidential data, so as to prevent unwanted access to the confidential data at the data source system over the open network. The data source system requests additional data from the secure data network through the secure data network interface system using the unique identifier, and the secure data network interface system translates the secure identifier to the confidential information for transmission over the secure data network and translates the confidential information to the unique identifier to transmit the additional data to the data source system over the open network.

The present invention provides many important technical advantages. One important technical advantage of the present invention is a system and method for managing merchant payment transaction processing accounts that allows a user to obtain pricing information without giving the user access to proprietary information, such as tiered pricing structures that are developed using knowledge that has been accumulated for classes of merchants.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
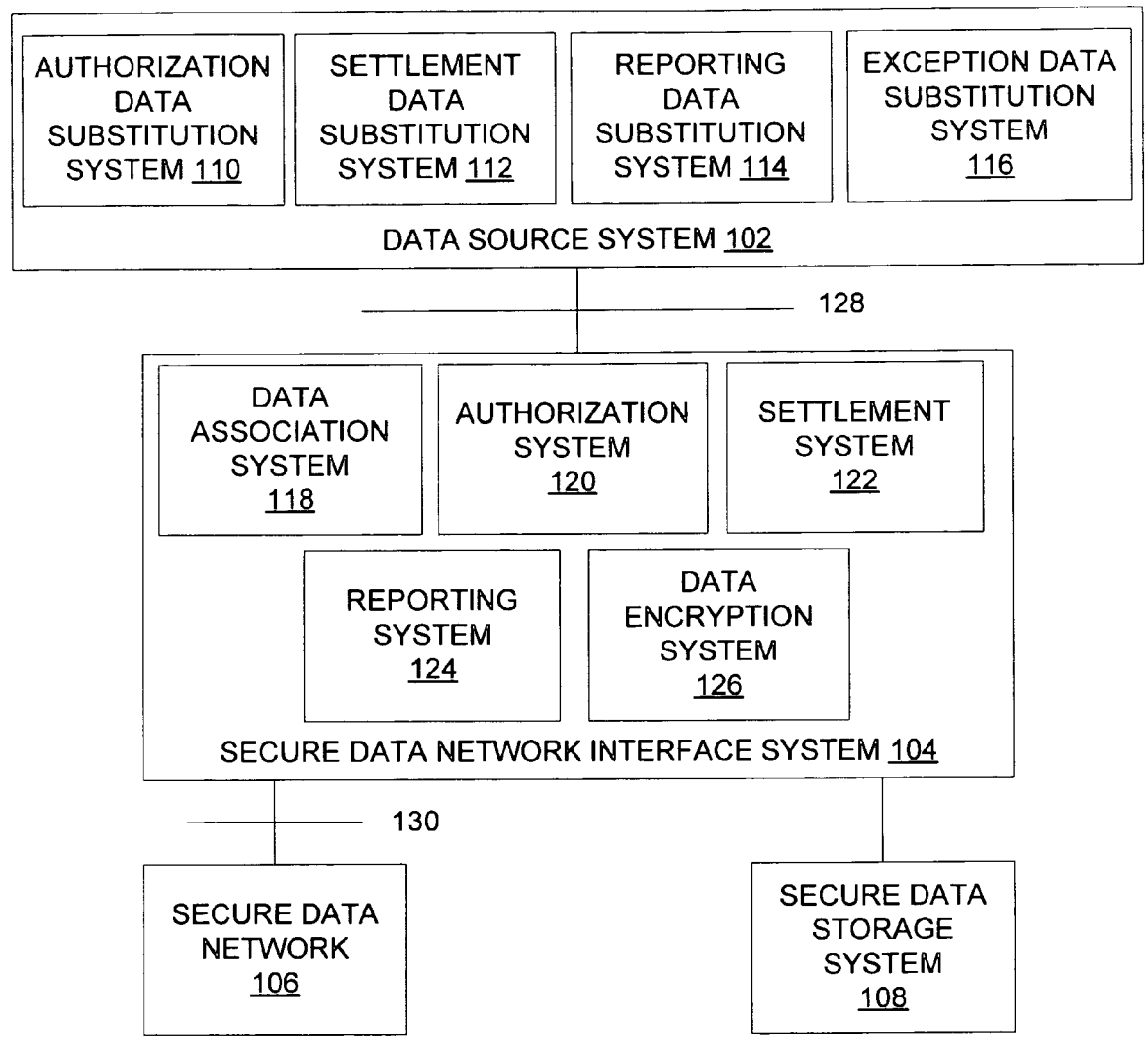
FIG. 1 is a diagram of a database system for encryption and protection of confidential data in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a database system 100 for encryption and protection of confidential data in accordance with an exemplary embodiment of the present invention. System 100 allows a computer on an open network to perform functions with confidential information without requiring that computer to store the confidential information so as to protect the confidential information from misappropriation.

Database system 100 includes data source system 102, secure data network interface system 104, secure data network 106 and secure data storage system 108, each of which can be implemented in hardware, software, or a suitable combination of hardware and software, and which can be one more software systems operating on a suitable processing platform. As used herein, a hardware system can include a suitable general purpose processor, an application specific integrated circuit, a field programmable gate array, or other suitable systems. A software system can include one or more objects, agents, threads, lines of code, subroutines, separate software applications, two or more lines of code or other suitable software structures operating in two or more software applications or on two or more processors, or other suitable software structures. In one exemplary embodiment, a software system can include one or more lines of code or other suitable software structures operating in a general purpose software application, such as an operating system, and one or more lines of code or other suitable software structures operating in a specific purpose software application.

Data source system 102 receives confidential data Ci and first associated data Da1. Confidential data Ci can be confidential business data, personal data, financial data, technical data, or other suitable data. First associated data Da1 can be non-confidential data that is associated with the confidential data, such as a file structure that has had all confidential data removed, a record identifier, a transaction identifier, or other suitable data. Confidential data Ci and first associated data Da1 is then provided to secure data network 106 through secure data network interface system 104, and first associated data Da1, unique encrypted identifier E1, second associated data Da2 without confidential data Ci is received in response. Data source system 102 stores first associated data Da1, unique encrypted identifier E1, second associated data Da2 without confidential data Ci, so as to prevent unwanted access to confidential data Ci at data source system 102 over open network 128. In one exemplary embodiment, data source system 102 stores the unique encrypted identifier Ei until a predetermined period of time has elapsed.

In another exemplary embodiment, data source system 102 requests additional data DaN from secure data network 106 through secure data network interface system 104 using the unique encrypted identifier Ei, and secure data network interface system 104 translates unique encrypted identifier Ei to confidential information Ci for transmission over secure data network 106. This request can be made by sending a structured request that contains only that information, a sequence of messages with that information, fields within an existing data format (such as the VISAD data format with that information, encrypted or unencrypted, or in other suitable manners. In one exemplary embodiment, secure data network interface system 104 translates confidential information Ci using unique encrypted identifier Ei to transmit the additional data DaN to data source system 102 over open network 128. In this exemplary embodiment, data fields in a pre-existing or proprietary data format that are blank, filler fields, or unassigned can be used to indicate that the message contains a request to translate Ei to Ci, so as to allow systems that are configured to process the pre-existing or proprietary data formats to also process the translation requests. Data source system 102 can also store the unique encrypted identifier Ei until a predetermined period of time has elapsed, until a predetermined period of time has elapsed after additional data DaN is received from secure data network 108.

Settlement data substitution system 112 transmits a settlement request Sr and unique encrypted identifier Ei to secure data network interface system 104 and receiving a settlement confirmation Sc and unique encrypted identifier Ei from secure data network interface system 104. This request can be made by sending a structured request that contains only that information, a sequence of messages with that information, fields within an existing data format (such as the VISAD data format or a proprietary data format) with that information, encrypted or unencrypted, or in other suitable manners. Data fields in a pre-existing or proprietary data format that are blank, filler fields, or unassigned can be used to indicate that the message contains Sr and Ei or to receive Sc and Ei, so as to allow systems that are configured to process the pre-existing or proprietary data formats to also process the settlement requests.

Reporting data substitution system 114 allows reporting data to be generated using unique encrypted identifier Ei. In one exemplary embodiment, data source system 102 provide unique encrypted identifier Ei to secure data network interface system 104 with report request Rr, and secure data network interface system 104 and secure data network 106 generate a report based on unique encrypted identifier Ei and report request Rr. This request can be made by sending a structured request that contains only that information, a sequence of messages with that information, fields within an existing data format (such as the VISAD data format or a proprietary data format) with that information, encrypted or unencrypted, or in other suitable manners. Data fields in a pre-existing or proprietary data format that are blank, filler fields, or unassigned can be used to indicate that the message contains Rr and Ei or to receive the report, so as to allow systems that are configured to process the pre-existing or proprietary data formats to also process the settlement requests.

Exception data substitution system 116 receives exception data Dd and unique encrypted identifier Ei from secure data network interface system 104 and transmits exception response data Dr to secure data network interface system 104 in response to exception data Dd. Exception data substitution system 116 receives a transaction identifier Ti, exception category data Dc and the unique encrypted identifier Ei from secure data network interface system 104 and transmits biometric data Bd to secure data network interface system 104 in response to the transaction identifier Ti, the exception category data Dc and the unique encrypted identifier Ei. This request can be made by sending a structured request that contains only that information, a sequence of messages with that information, fields within an existing data format (such as the VISAD data format or a proprietary data format) with that information, encrypted or unencrypted, or in other suitable manners. Data fields in a pre-existing or proprietary data format that are blank, filler fields, or unassigned can be used to indicate that the message contains Dr or Bd and to receive Dc, so as to allow systems that are configured to process the pre-existing or proprietary data formats to also process the settlement requests.

Secure data network interface system 104 receives confidential data Ci and first associated data Da1 from data source system 102, stores confidential data Ci and first associated data Da1 in secure data storage system 108, and interfaces with systems over secure data network 106 to obtain second associated data Da2. In one exemplary embodiment, secure data network interface system 104 can access frame relay connections, dedicated communications lines, or other secure data communications media to obtain second associated data Da2 in response to the confidential data Ci and first associated data Da1, additional data DaN in response to subsequent queries, or other suitable data. Secure data network interface system 104 provides unique encrypted identifier Ei and second associated data Da2 to data source system 102 over open network 128.

Secure data network interface system 104 includes data association system 118, authorization system 120, settlement system 122, reporting system 124 and data encryption system, each of which can be implemented in hardware, software or a suitable combination of hardware and software, and which can be one or more software systems operating on a general purpose processing platform. Secure data network interface system 104 can receive a structured request that only contains information from one or more systems of data source system 102, a sequence of messages with that information, fields within an existing data format (such as the VISAD data format or a proprietary data format) with that information, encrypted or unencrypted, or in other suitable manners. Data fields in a pre-existing or proprietary data format that are blank, filler fields, or unassigned can be used to indicate that the message contains data from one or more of the systems of data source system 102, or to transmit data to those systems, so as to allow systems that are configured to process the pre-existing or proprietary data formats to also process the settlement requests.

Data association system 118 associates the confidential data Ci with unique encrypted identifier Ei and stores confidential data E1, first associated data Da1 and unique encrypted identifier Ei in secure data storage system 108. In one exemplary embodiment, unique encrypted identifier Ei can be keyed to some or all of the data in first associated data Da1, confidential data Ci, both Ei and Ci, state data that indicates whether data has been received from data source system 102, secure data network 106, or other suitable sources, or other suitable data. Data association system 118 also receives second associated data Da2, associates second associated data Da2 with confidential data Ci, first associated data Da1 and unique encrypted identifier Ei, and stores confidential data Ci, first associated data Da1 and unique encrypted identifier Ei in secure data storage system 108.

Authorization system 120 performs authorization using the confidential information Ci and the first associated data Da1. In one exemplary embodiment, authorization system 120 can send an authorization request Ar to secure data network 106, and can receive an authorization indicator Ai that identifies whether authorization was approved or denied, the reason why authorization was denied, a request for additional information, or other suitable data.

Settlement system 122 performs settlement using the confidential information Ci and the first associated data Da1. In one exemplary embodiment, settlement system 122 can send a settlement request Sr to secure data network 106, and can receive settlement data Sd that identifies whether settlement was processed or denied, the reason why settlement was denied, a request for additional information, or other suitable data.

Reporting system 124 provides reporting functions using unique encrypted identifier Ei, confidential data Ci, first associated data Da1, second associated data Da2, additional data DaN, or other suitable data. In one exemplary embodiment, reporting system 124 can receive a plurality of unique encrypted identifiers and can obtain the corresponding confidential data Ci, first associated data Da1, second associated data Da2, authorization request Ar, authorization indicator Ai, settlement request Sr, settlement data Sd, or other suitable data, and can generate reports based on the types of data specified, available data, or other suitable data.

Data encryption system 126 generates a unique encrypted identifier Ei for confidential data Ci. In one exemplary embodiment, the unique encrypted identifier Ei can have the same data format as the confidential information, so as to allow the data source system to operate without modification. In this exemplary embodiment, the data source system can store the unique encrypted identifier Ei as if it were the unencrypted confidential information, so as to allow the use of the unique encrypted identifier Ei to be seamlessly transparent to the user of data source system 102. Likewise, suitable systems can be used to interface with existing systems of data source system 102 so as to locally translate the unique encrypted identifier Ei, to modify the systems of data source system 102 to accept a unique encrypted identifier Ei that has a different size or data structure than the confidential data Ci, or to perform other suitable functions.

Secure data storage system 108 is coupled to secure data network interface system 104, and is isolated from open network 128. In one exemplary embodiment, secure data storage system 108 can be isolated from secure data network interface system 104 by a dedicated communications medium, one or more firewalls, and can have other suitable security measures, such as active monitoring for security threats. As such, the level of security that can be provided using secure data storage system 108 is much greater than is typically provided for data source system 102.

Secure data network 106 is coupled to secure data network interface system 104, receives the confidential data Ci and the first associated data Da1, and generates second associated data Da2. Secure data network 106 provides second associated data Da2 to secure data network interface system 104.

In operation, database system 100 allows confidential information Ci to be used over an open network without the need to store the confidential information in a data storage device that is accessible over the open network. In this manner, data source systems can receive confidential medical data, financial data, personal data, or other suitable data and can perform a variety of functions using the confidential data without the need to store the confidential data or otherwise incur costs for protecting the confidential data from third parties.

Figure 2:
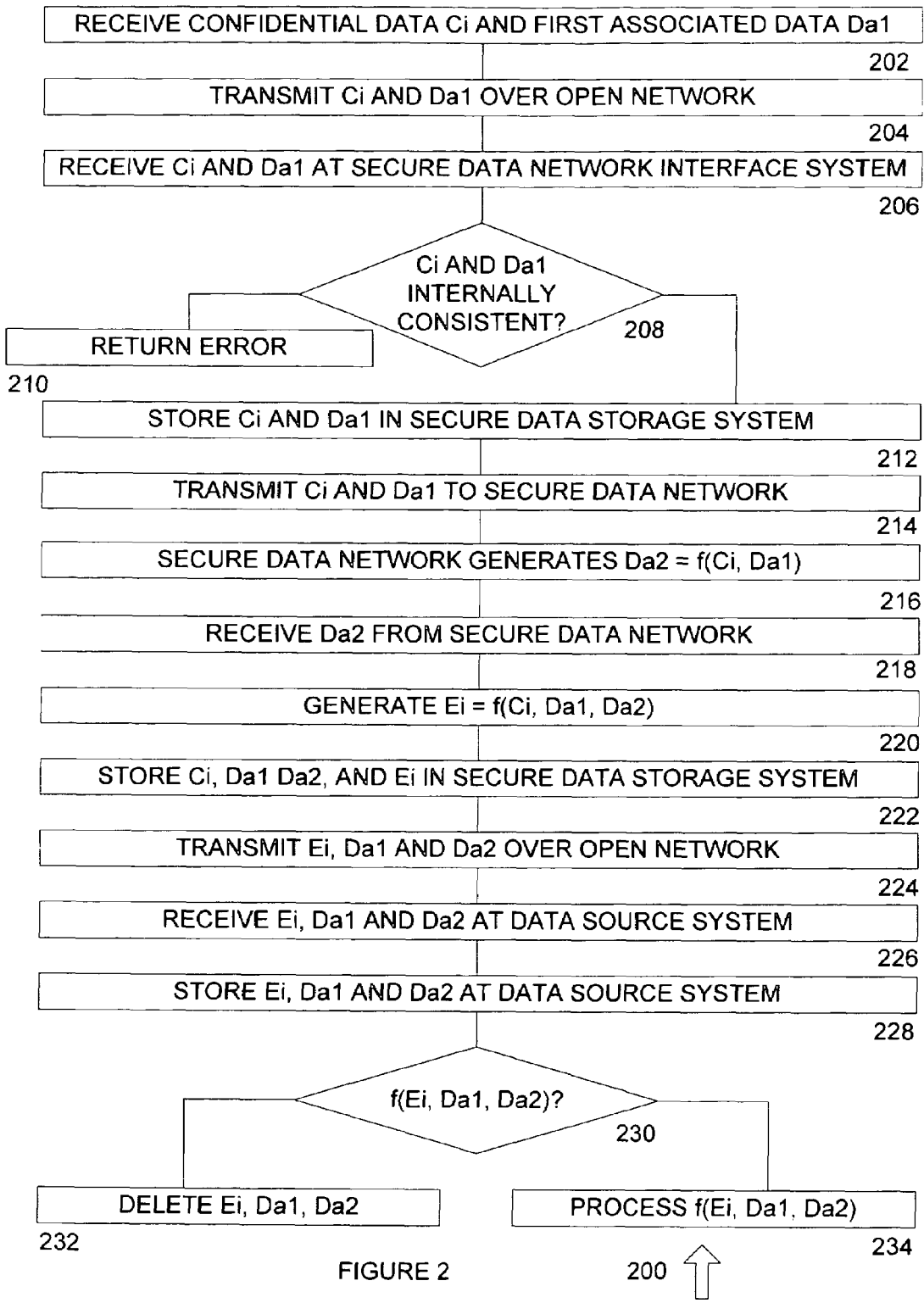
FIG. 2 is a flow chart of a method for encryption and protection of confidential data.

FIG. 2 is a flow chart of a method 200 for encryption and protection of confidential data. Method 200 begins at 202 where confidential data Ci and first associated data Da1 is received, such as at a data source system. The method then proceeds to 204 where the confidential data Ci and the first associated data Da1 is transmitted from the data source system over an open network to a data network interface system. The method then proceeds to 206.

At 206, confidential data Ci and first associated data Da1 is received at a secure data network interface system, and it is determined at 208 whether Ci and Da1 are internally consistent. In one exemplary embodiment, confidential data Ci and first associated data Da1 can have a predetermined structure with alpha and numeric fields, predetermined field values, address data, or other suitable data, and it can be determined whether the data is internally consistent. If the data is not internally consistent, the method proceeds to 210 and an error is returned. Otherwise, the method proceeds to 212 where Ci and Da1 are stored in a secure data storage system that is coupled to the data network interface system and isolated from the open network. The method then proceeds to 214.

At 214, confidential data Ci and first associated data Da1 is transmitted to a secure data network. At 216, second associated data Da2 is generated at the secure data network in response to confidential data Ci and first associated data Da1. In exemplary embodiments, second associated data Da2 can be medical claim data, financial data, credit card authorization data, funds transfer data, national security data, crime enforcement data, or other suitable data. The method then proceeds to 218 where the second associated data Da2 is received from the secure data network at the secure data network interface system. At 220, unique encrypted identifier Ei is generated, such as based on confidential data Ci, first associated data Da1 and second associated data Da2, or other suitable data. In exemplary embodiments, the format of the unique encrypted identifier Ei can be the same as the format of the confidential data Ci, the content of the data fields of Ei can be generated from the content of Da1 and Da2, or other suitable processes can be used. The method then proceeds to 22.

At 222, second associated data Da2 is associated with the confidential data Ci, the first associated data Da1, and the unique encrypted identifier Ei at the secure data network interface system. The confidential data Ci, first associated data Da1, second associated data Da2, and the unique encrypted identifier Ei can be stored in the secure data storage system. The method then proceeds to 224.

At 224, unique encrypted identifier Ei and second associated data Da2 is transmitted to the data source system over the open network, and Ei, Da1, Da2 and other suitable data is stored at the data source system, without the confidential data, so as to prevent unwanted access to the confidential data at the data source system over the open network. The method then proceeds to 230.

At 230, it is determined whether additional data has been requested from the secure data network through the secure data network interface system using the unique encrypted identifier Ei. If it is determined that a predetermined period of time has elapsed since the unique encrypted identifier Ei has been received without a suitable function being implemented, then the method proceeds to 232 where the data is deleted. Otherwise, a suitable function is performed. For example, unique encrypted identifier Ei and other suitable data can be transmitted to the secure data network interface system for transmission over the secure data network, the confidential information can be translated to the unique identifier to transmit the additional data to the data source system over the open network. A settlement request can be transmitted with the unique identifier to the secure data network interface system, and a settlement confirmation and the unique identifier can be received from the secure data network interface system. Exception data and unique encrypted identifier can also be received from the secure data network interface system and exception response data can be transmitted to the secure data network interface system in response to the exception data. A transaction identifier, exception category data and the unique identifier can also be received from the secure data network interface system and biometric data can be transmitted to the secure data network interface system in response to the transaction identifier, the exception category data and the unique identifier.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A database system for encryption and protection of confidential data comprising:
    a data source system receiving confidential data and first associated data;
    a secure data network interface system coupled to the data source system over an open network, the data network interface system receiving the confidential data and the first associated data from the data source system, the data network interface system further comprising:
        a secure data storage system coupled to the data network interface system and isolated from the open network;
        a data encryption system generating a unique encrypted identifier for the confidential data; and
        a data association system associating the confidential data with the unique encrypted identifier and storing the confidential data, the first associated data and the unique encrypted identifier in the secure data storage system;
    a secure data network coupled to the secure data network interface system, the secure data network receiving the confidential data and the first associated data, generating second associated data, and providing the second associated data to the secure data network interface system;
    the data association system of the secure data network interface system receiving the second associated data, associating the second associated data with the confidential data, the first associated data and the unique encrypted identifier and storing the confidential data, the first associated data and the unique encrypted identifier in the secure data storage system;
    the secure data network interface system providing the unique encrypted identifier and the second associated data to the data source system over the open network;
    the data source system storing the first associated data, the unique identifier and the second associated data without the confidential data, so as to prevent unwanted access to the confidential data at the data source system over the open network; and
    wherein the data source system requests additional data from the secure data network through the secure data network interface system using the unique identifier, and the secure data network interface system translates the secure identifier to the confidential information for transmission over the secure data network and translates the confidential information to the unique identifier to transmit the additional data to the data source system over the open network;
    wherein the data source system further comprises a exception data substitution system receiving exception data and the unique identifier from the secure data network interface system and transmitting exception response data to the secure data network interface system in response to the exception data.

2. The system of claim 1 wherein the data source system stores the unique identifier until a predetermined period of time has elapsed after the additional data is received from the secure data network.

3. The system of claim 1 wherein the data source system further comprises a settlement data substitution system transmitting a settlement request and the unique identifier to the secure data network interface system and receiving a settlement confirmation and the unique identifier from the secure data network interface system.

4. The system of claim 1 wherein the exception data substitution system receives a transaction identifier, exception category data and the unique identifier from the secure data network interface system and transmitting biometric data to the secure data network interface system in response to the transaction identifier, the exception category data and the unique identifier.

5. The system of claim 1 wherein the data source system and the secure data network interface system utilize data fields in a proprietary or pre-existing messaging format to communicate using the unique encrypted identifier.

6. A method for encryption and protection of confidential data comprising:
    receiving confidential data and first associated data at a data source system;
    transmitting the confidential data and the first associated data from the data source system over an open network to a data network interface system;

storing the confidential data and the first associated data in a secure data storage system that is coupled to the data network interface system and isolated from the open network;

transmitting the confidential data and the first associated data to a secure data network;

generating second associated data at the secure data network in response to the confidential data and the first associated data;

transmitting the second associated data to the secure data network interface system;

generating a unique encrypted identifier for the confidential data;

associating the second associated data with the confidential data, the first associated data and the unique encrypted identifier at the secure data network interface system;

storing the confidential data, the first associated data, the second associated data and the unique encrypted identifier in the secure data storage system;

transmitting the unique encrypted identifier and the second associated data to the data source system over the open network;

storing the first associated data, the unique identifier and the second associated data at the data source system without the confidential data, so as to prevent unwanted access to the confidential data at the data source system over the open network;

requesting additional data from the secure data network through the secure data network interface system using the unique identifier;

translating the secure identifier to the confidential information at the secure data network interface system for transmission over the secure data network; and translating the confidential information to the unique identifier to transmit the additional data to the data source system over the open network;

receiving exception data and the unique identifier from the secure data network interface system and transmitting exception response data to the secure data network interface system in response to the exception data.

7. The method of claim 6 further comprising storing the unique identifier at the data source system until a predetermined period of time has elapsed after the additional data is received from the secure data network.

8. The method of claim 6 further comprising transmitting a settlement request and the unique identifier to the secure data network interface system and receiving a settlement confirmation and the unique identifier from the secure data network interface system.

9. The method of claim 6 further comprising receiving a transaction identifier, exception category data and the unique identifier from the secure data network interface system and transmitting biometric data to the secure data network interface system in response to the transaction identifier, the exception category data and the unique identifier.

10. The method of claim 6 further comprising using data fields in a proprietary or pre-existing messaging format to communicate using the unique encrypted identifier.

11. A database system for encryption and protection of confidential data comprising:

a data source system receiving confidential data and first associated data;

a secure data network interface system coupled to the data source system over an open network, the data network interface system receiving the confidential data and the first associated data from the data source system, the data network interface system having means for securely storing the confidential data and the first associated data, generating a unique encrypted identifier for the confidential data, and associating the confidential data with the unique encrypted identifier;

a secure data network coupled to the secure data network interface system, the secure data network receiving the confidential data and the first associated data, generating second associated data, and providing the second associated data to the secure data network interface system;

the secure data network interface system further having means for receiving the second associated data, associating the second associated data with the confidential data, the first associated data and the unique encrypted identifier;

the secure data network interface system further having means for providing the unique encrypted identifier and the second associated data to the data source system over the open network; and wherein the data source system includes means for requesting additional data from the secure data network through the secure data network interface system using the unique identifier, and the secure data network interface system includes means for translating the secure identifier to the confidential information for transmission over the secure data network and translating the confidential information to the unique identifier to transmit the additional data to the data source system over the open network;

wherein the data source system further comprises means for receiving exception data and the unique identifier from the secure data network interface system and transmitting exception response data to the secure data network interface system in response to the exception data.

12. The system of claim 11 wherein the data source system includes means for storing the unique identifier until a predetermined period of time has elapsed after the additional data is received from the secure data network.

13. The system of claim 11 wherein the data source system further comprises means for transmitting a settlement request and the unique identifier to the secure data network interface system and receiving a settlement confirmation and the unique identifier from the secure data network interface system.

14. The system of claim 11 wherein the data source system further comprises means for receiving a transaction identifier, exception category data and the unique identifier from the secure data network interface system and transmitting biometric data to the secure data network interface system in response to the transaction identifier, the exception category data and the unique identifier.

15. The system of claim 11 wherein the data source system and the secure data network interface system include means for utilizing data fields in a proprietary or pre-existing messaging format to communicate using the unique encrypted identifier.

* * * * *